(12) United States Patent
Cintra et al.

(10) Patent No.: US 7,932,700 B2
(45) Date of Patent: Apr. 26, 2011

(54) BATTERY WITH INTEGRATED VOLTAGE CONVERTER

(75) Inventors: George M. Cintra, Holliston, MA (US); Kirakodu S. Nanjundaswamy, Sharon, MA (US); Alexander Kaplan, Providence, RI (US); David C. Batson, Winchester, MA (US); David Leigh DeMuth, Maynard, MA (US); Leslie J. Pinnell, Framingham, MA (US); Frank Kressmann, Eschborn (DE); Joern Riemer, Friedrichsdorf (DE); Leo Faranda, Rodgau (DE)

(73) Assignee: The Gillette Company, Boston, MA (US)

( * ) Notice: Subject to any disclaimer, the term of this patent is extended or adjusted under 35 U.S.C. 154(b) by 647 days.

(21) Appl. No.: 11/776,350

(22) Filed: Jul. 11, 2007

(65) Prior Publication Data
US 2008/0238369 A1 Oct. 2, 2008

Related U.S. Application Data

(60) Provisional application No. 60/908,014, filed on Mar. 26, 2007.

(51) Int. Cl.
*H02J 7/00* (2006.01)
*H02J 7/16* (2006.01)
*H02J 7/06* (2006.01)
*H01M 14/00* (2006.01)

(52) U.S. Cl. ........ 320/135; 320/112; 320/140; 320/157; 320/158; 429/7

(58) Field of Classification Search .................. 320/112, 320/134, 136, 133, 135, 140, 157–158; 429/7
See application file for complete search history.

(56) References Cited

U.S. PATENT DOCUMENTS

| 5,670,862 | A | | 9/1997 | Lewyn |
| 6,074,775 | A | * | 6/2000 | Gartstein et al. ............... 429/53 |
| 6,118,248 | A | * | 9/2000 | Gartstein et al. ............. 320/107 |
| 6,127,804 | A | | 10/2000 | Oglesbee et al. |
| 6,163,131 | A | * | 12/2000 | Gartstein et al. ............. 320/118 |
| 6,198,250 | B1 | * | 3/2001 | Gartstein et al. ............. 320/112 |

(Continued)

FOREIGN PATENT DOCUMENTS
GB     2 040 606     8/1980
(Continued)

OTHER PUBLICATIONS

US Patent Application "Portable Energy Storage and Charging Device" U.S. Appl. No. 11/775,995, filed Jul. 11, 2007, David C. Batson et al.

(Continued)

*Primary Examiner* — Richard V Muralidar
(74) *Attorney, Agent, or Firm* — Fish & Richardson P.C.

(57) ABSTRACT

A battery that includes an electrochemical cell having an internal bore therethrough is described herein. The battery also includes a voltage converter module electrically coupled to the electrochemical cell and disposed within a portion of the internal bore The voltage converter is configured to convert a first voltage produced by the electrochemical cell into a second, different voltage.

20 Claims, 11 Drawing Sheets

U.S. PATENT DOCUMENTS

| | | | |
|---|---|---|---|
| 6,534,953 B2 | 3/2003 | Shirakawa | |
| 6,534,954 B1 | 3/2003 | Plett | |
| 6,654,228 B1 * | 11/2003 | Bailey | 361/502 |
| 6,835,491 B2 * | 12/2004 | Gartstein et al. | 429/92 |
| 7,071,653 B2 | 7/2006 | Suzuki et al. | |
| D532,372 S | 11/2006 | Keating | |
| D532,745 S | 11/2006 | Gaber et al. | |
| 7,227,336 B1 | 6/2007 | van Schalkwijk et al. | |
| 7,656,131 B2 * | 2/2010 | Embrey et al. | 320/162 |
| 2004/0234865 A1 | 11/2004 | Sato et al. | |
| 2005/0162131 A1 | 7/2005 | Sennami et al. | |
| 2005/0194934 A1 * | 9/2005 | Iijima et al. | 320/128 |
| 2005/0233218 A1 | 10/2005 | Ogawa et al. | |
| 2005/0244716 A1 | 11/2005 | Ogawa et al. | |
| 2006/0061330 A1 | 3/2006 | Sato et al. | |
| 2006/0164035 A1 | 7/2006 | Van Beek et al. | |
| 2006/0197496 A1 | 9/2006 | Iijima et al. | |
| 2006/0208695 A1 | 9/2006 | Weinstein et al. | |
| 2007/0037049 A1 | 2/2007 | Iijima et al. | |
| 2007/0063669 A1 | 3/2007 | Keating | |
| 2007/0075682 A1 | 4/2007 | Guang et al. | |

FOREIGN PATENT DOCUMENTS

| | | |
|---|---|---|
| JP | 2006012613 A | 1/2006 |
| WO | WO2006097586 A1 | 9/2006 |
| WO | WO2007017164 A2 | 2/2007 |
| WO | WO2007017165 A2 | 2/2007 |

OTHER PUBLICATIONS

US Patent Application "Adaptive Charger Device and Method" U.S. Appl. No. 11/775,987, filed Jul. 11, 2007, Leslie J. Pinnell et al.

US Patent Application "Ultra Fast Battery Charger with Battery Sensing" U.S. Appl. No. 11/776,261, filed Jul. 11, 2007, Jordan T. Bourilkov et al.

US Patent Application "Lithium Iron Phosphate Ultra Fast Battery Charger" U.S. Appl. No. 11/775,966, filed Jul. 11, 2007, Jordan T. Bourilkov et al.

US Patent Application "Fast Battery Charger Device and Method" U.S. Appl. No. 11/776,021, filed Jul. 11, 2007, Leslie J. Pinnell et al.

US Patent Application "Battery Charger with Mechanism to Automatically Load and Unload Batteries" U.S. Appl. No. 11/775,979, filed Jul. 11, 2007, Matthew R. Stone et al.

* cited by examiner

BATTERY WITH INTEGRATED VOLTAGE CONVERTER

CROSS-REFERENCE TO RELATED APPLICATIONS

This application claims priority to U.S. Provisional Application Ser. No. 60/908,014, entitled "Single Electrochemical Cell with Integrated Voltage Converter Module" and filed on Mar. 26, 2007, the content of which is hereby incorporated by reference in its entirety.

BACKGROUND

Commercial electrochemical cells (e.g., electrochemical cells for AA, AAA, C and D batteries) based on, for example, NiCad, NiMH, Alkaline and/or $LiFeS_2$ chemistries have an open circuit voltage (OCV) in the range of 1.4-1.8V. Depending on the chemistry of the electrochemical cell and the drain caused by the load connected to the cell, the closed circuit voltages (CCV) for commercial electrochemical cells during use are usually in the range of 1.8V to 0.9V. Common types of consumer portable battery-operable devices are thus often designed to operate at voltage levels commensurate with the voltage/power levels provided by off-the-shelf batteries having the above-specified chemistry types. Higher voltage electrochemical primary batteries and secondary batteries (i.e., rechargeable batteries), such as batteries based on Lithium/$MnO_2$ and Lithium Ion chemistries, generally have higher energy and power density than those of lower voltage batteries.

SUMMARY

Disclosed is a battery having at least one high voltage electrochemical cell (greater than 1.8V) internally integrated with a voltage converter module. The voltage converter module is coupled to the electrochemical cell cathode and anode current collectors. The voltage converter module and all of components of the high voltage electrochemical cell may be packaged in standard size batteries, including cylindrical batteries such as AAA, AA, C, and D batteries, prismatic batteries, button-batteries, etc. The voltage converter module reduces the high voltage provided by the at least one electrochemical cell into a lower voltage (e.g., less than or equal to 1.8V) which is compatible with commercial battery-operable devices.

A battery having an internally integrated voltage converter module can include either primary or secondary high voltage electrochemical cells. In circumstances in which secondary (i.e., rechargeable) electrochemical cells are used in the construction, a charging current may be applied through additional battery terminal disposed on the battery's casing.

By combining a high voltage electrochemical cell and the voltage converter module, the battery extends the run time of battery-operable devices which are typically powered by low voltage standard batteries.

The battery described herein provides flat discharge curve rather than the sloping discharge curves sometimes exhibited by commercial standard batteries.

In one aspect, a battery is disclosed. The battery includes an electrochemical cell having an internal bore therethrough, and a voltage converter module electrically coupled to the electrochemical cell and disposed within a portion of the internal bore, the voltage converter configured to convert a first voltage produced by the electrochemical cell into a second, different voltage.

Embodiments may include one or more of the following.

The electrochemical cell may be configured to be charged to a charge level of at least 90% capacity in fifteen minutes or less.

The electrochemical cell includes a lithium-iron-phosphate cell.

The battery may further include a battery case that houses the electrochemical cell and the voltage converter, and a set of external terminals disposed on the battery case to which the second voltage is provided.

The battery may further include set of tabs coupled between the electrochemical cell and voltage converter module, and a second set of tabs coupled between the voltage converter module and external terminals supported by the battery case.

The voltage converter module may include an electronic switching device, and a controller electrically coupled to the electronic switching device, the controller configured to control the electronic switching device.

The controller may be configured to monitor a voltage level at the set of external terminals, and cause the electronic switching device to be switched based on the monitored voltage level so that the voltage level at the external terminal is substantially equal to a predetermined voltage level.

In another aspect, a battery is disclosed. The battery includes at least one electrochemical cell configured to be charged to a charge level of at least 90% capacity in fifteen minutes or less, a voltage converter module electrically coupled to the at least one electrochemical cell and configured to convert a first voltage produced by the at least one electrochemical cell into a second, different voltage, a battery case that houses the at least one electrochemical cell and the voltage converter, and a set of external terminals disposed on the battery case to which the second voltage is provided.

Embodiments may include one or more of the following.

The voltage converter module may include an electronic switching device, and a controller electrically coupled to the electronic switching device, the controller configured to control the electronic switching device. The controller may be configured to monitor a voltage level at the set of external terminals, and cause the electronic switching device to be switched based on the monitored voltage level so that the voltage level at the external terminal is substantially equal to a predetermined voltage level.

The at least one electrochemical cell may include a Li-Ion cell. The Li-Ion cell may include a lithium-iron-phosphate cell.

The first voltage produced by the at least one electrochemical cell may be greater than 1.8V.

The electrochemical cell may include a jelly roll filled with an electrolyte solution, the jelly roll defining an internal bore passing through the jelly roll, and the voltage converter module may be disposed within the internal bore.

The battery may further include at least one additional terminal configured to receive charging current to recharge the battery and direct the charging current to electrodes coupled to the at least one electrochemical cell.

In a further aspect, a method is disclosed. The method includes converting a first voltage at electrodes coupled to at least one electrochemical cell to a second, different voltage, with the electrodes and the at least one electrochemical cell disposed in a battery case, the at least one electrochemical cell configured to be charged to a charge level of at least 90% capacity in fifteen minutes or less, and providing the second voltage at external terminals disposed on the battery case.

Embodiments may include one or more of the following.

Converting the first voltage may include controlling an electronic switching device. Controlling the electronic switching device may include monitoring a voltage level at the external terminals, and causing the electronic switching device to be switched based on the monitored voltage level so that the voltage level at the external terminals is substantially equal to a predetermined voltage level.

Converting the first voltage at the electrodes of the at least one electrochemical cell may include converting the first voltage at the electrodes of at least one lithium-iron-phosphate cell.

The method may further include determining a current level to apply to the at least one electrochemical cell such that the at least one electrochemical cell achieves a charge level of at least 90% of the charge capacity of the at least one electrochemical cell in fifteen minutes or less, and applying a charging current substantially equal to the determined current level to the at least one electrochemical cell. Applying the charging current may include applying the charging current to the set of external terminals. Applying the charging current may include applying the charging current to at least one additional charging terminal disposed on the battery case, the at least one additional charging terminal coupled to the electrodes coupled to the at least one electrochemical cell.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
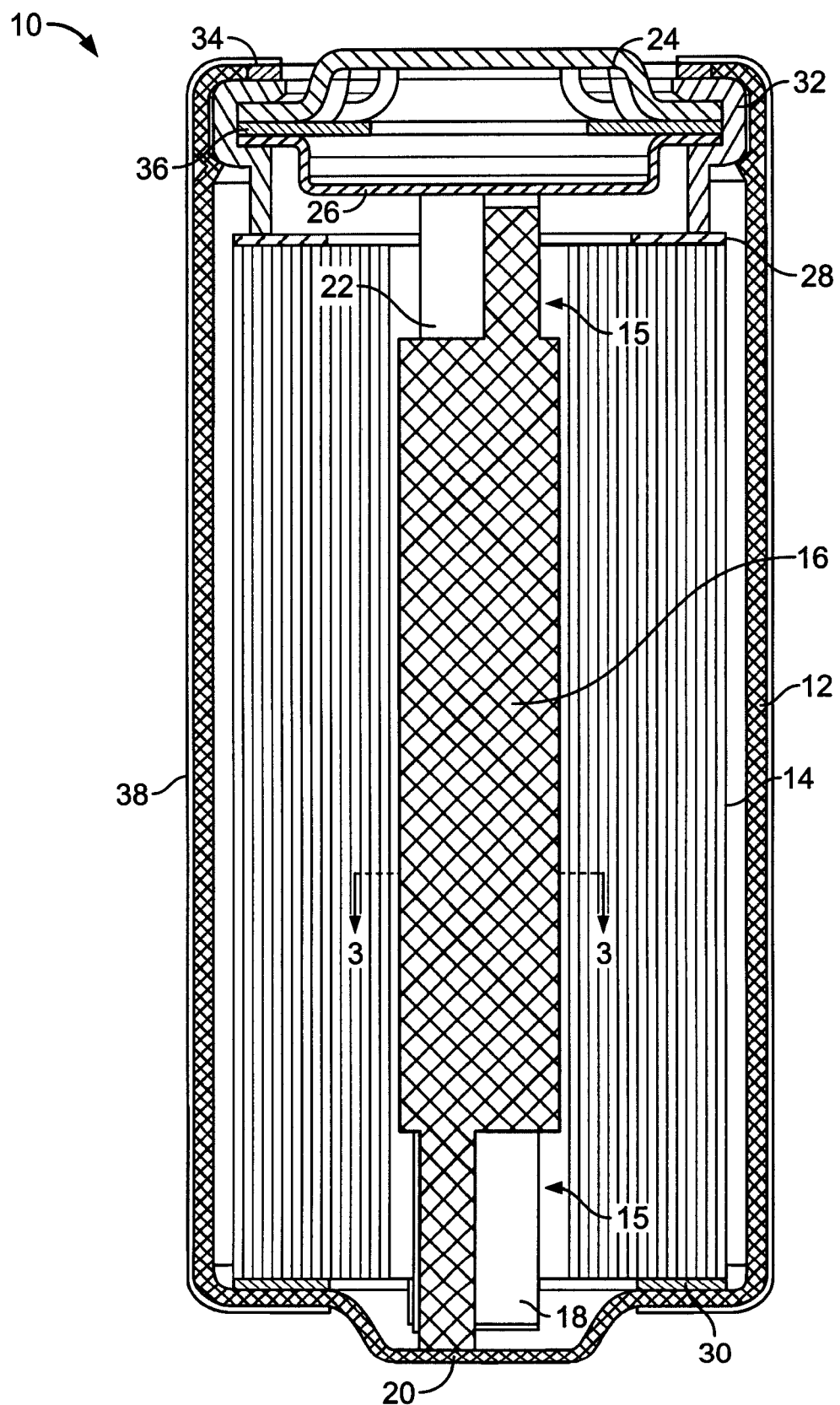
FIG. 1A is a cross-sectional view of a battery with an integrated voltage converter module.

Referring to FIG. 1A, a battery 10 having a generally convention external configuration here corresponding to an "AA battery" is shown. The battery 10 incorporates at least one high voltage electrochemical cell and an internal voltage converter 40. The battery 10 can be a secondary cell (or battery) or a primary cell (battery). Primary electrochemical cells are meant to be discharged, e.g., to exhaustion, only once, and then discarded. Primary cells are not intended to be recharged. Primary cells are described, for example, in David Linden, Handbook of Batteries (McGraw-Hill, 2d ed. 1995). Secondary electrochemical cells can be recharged for many times, e.g., more than fifty times, more than a hundred times, or more. In some cases, secondary cells can include relatively robust separators, such as those having many layers and/or that are relatively thick. Secondary cells can also be designed to accommodate for changes, such as swelling, that can occur in the cells. Secondary cells are described, e.g., in Falk & Salkind, "Alkaline Storage Batteries", John Wiley & Sons, Inc. 1969; U.S. Pat. No. 345,124; and French Patent No. 164,681, all hereby incorporated by reference.

In some embodiments, and as will be described in greater detail below, the battery 10 is a rechargeable (or secondary) Li-Ion electrochemical cell having graphitic anode material or lithium titanate anode material, and lithiated-iron-phosphate cathode materials adapted to enable fast recharge of rechargeable batteries (e.g., a battery capable of achieving a charge level of approximately 80-90% of the battery's charge capacity in fifteen minutes or less.) Furthermore, although FIG. 1A shows a cylindrical AA battery, an internal voltage converter may be incorporated with other type of cylindrical batteries, as well as with prismatic batteries, button-cell batteries, and so forth. The battery 10 includes a battery case 12 in which a wound electrode and separator stack jelly roll 14 constituting the at least one electrochemical cell of the battery 10 are disposed. A jelly roll typically includes an anode in electrical contact with a negative lead, a cathode in electrical contact with a positive lead, a separator, and an electrolyte. Anode, cathode, separator, and the electrolyte are contained within a housing. The electrolyte includes one or more solvents and a salt that is at least partially dissolved in the solvent system.

Figure 1B:
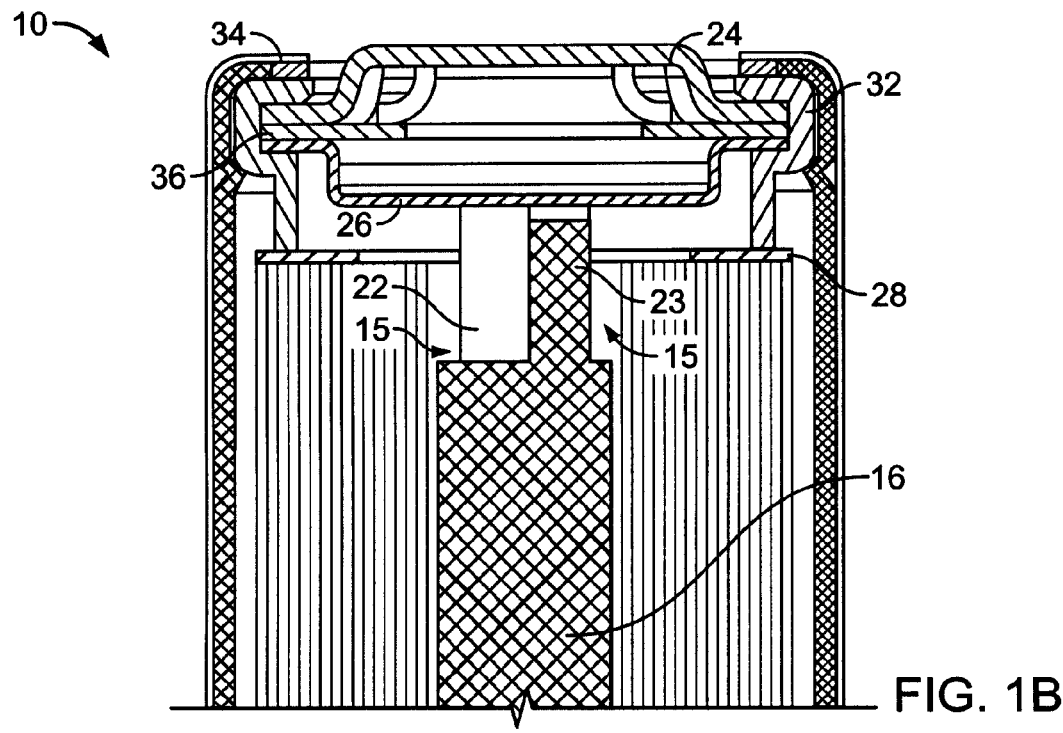
FIGS. 1B and 1C are enlarged views of portions of the cross-sectional view of FIG. 1A.
Figure 1C:
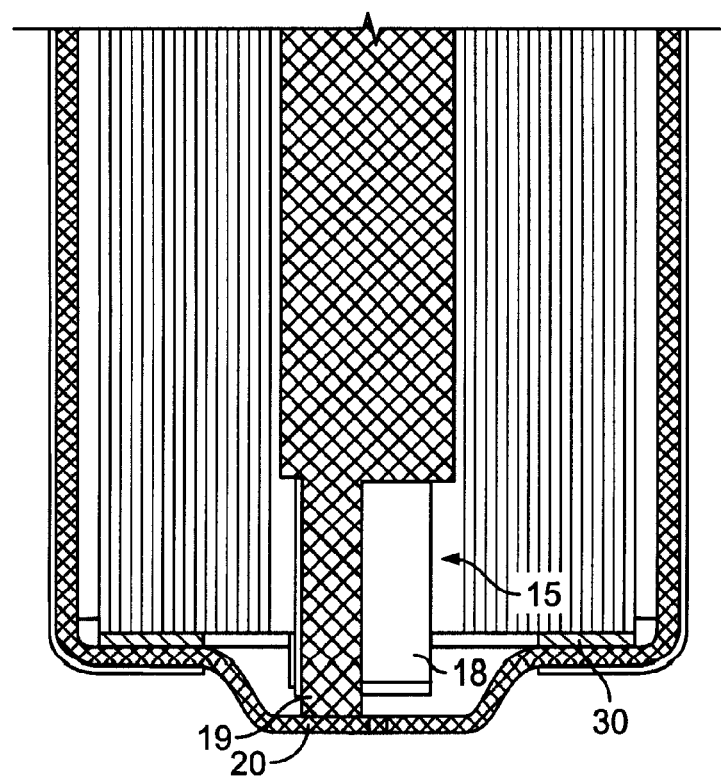

In the embodiment shown in FIGS. 1A-C, the jelly roll 14 defines a central internal bore 15 that extends along the longitudinal axis of the roll 14 and in which a converter housing 16 that contains the electrical circuitry of the DC-DC converter 40 (shown, for example, in FIG. 2) is placed. The DC-DC converter 40 is configured to convert a first voltage produced by the electrochemical cells of the battery 10 to a desired second voltage provided to a battery-operable device with which the battery 10 is to be used. In some embodiments, the converter housing 16 is a hollow cylindrical tube, sealed at its ends, and configured to receive the DC-DC voltage converter circuitry.

The jelly roll 14 is coupled to the DC-DC voltage converter 40 via a conductive tab 18, located proximate to the positive conductive terminal 20 of battery 10, and a tab 22 connected proximate to the negative cap terminal 24 (the positive and negative terminals are the terminals through which voltage/current produced by the battery 10 is applied to a battery-operable device.) The tabs 18 and 22 couple respectively to the cathode and anode electrodes of the battery 10.

Referring to FIGS. 1B and 1C, two additional tabs, namely tabs 19 and 23, mechanically secure the converter housing 16 to the battery case 12 and to a safety vent disc 26 located proximate the negative cap terminal 24. In some embodiments, the tabs 19 and 23 are secured to the battery case 12 and/or the vent disc 26 by welding the tabs to the case 12 and to the disc 26, respectively. The tabs 19 and 23 are also configured to electrically couple the voltage converter module 40 to the terminals 20 and 24, respectively. Current/voltage converted by the voltage converter module 40, as will be described in greater details below, is thus provided to the external terminals 20 and 24 of the battery 10, with which a battery-operable device establishes an electrical contact.

The battery 10 further includes a top insulator 28 and a bottom insulator 30 disposed at ends of the cylindrical battery case 12. The top and bottom insulators 28 and 30 prevent leakage from the jelly roll 14. The battery 10 also includes a non-conductive polymer seal 32 to insulate the negative cap 24 from the jelly roll constituting the electrochemical cell of the battery 10 and an insulating washer 34.

Disposed next to the negative terminal cap 24 is a PPTC element 36 (Polymeric Positive Thermal Coefficient) element. The battery 19 also includes an insulating wrap 38 covering the exterior of the battery case 12 to insulate the battery 10 from external stray electrical current and charges.

Generally, to manufacture the battery 10, the voltage converter module (e.g., converter 40) is disposed in the center of the jelly roll 14 after the jelly roll is wound on a mandrel. The tabs 18 and 22 extending, respectively, from the cathode and the anode that are wound in the jelly roll are connected to the voltage converter module. The tabs 19 and 23, shown in FIGS. 1B and 1C, that extend from the converter housing 16, are welded, or otherwise attached to the battery's case 12 and the vent disc 26. After all the connections are made, the jelly roll 14 is filled with electrolyte and crimped.

Figure 2:
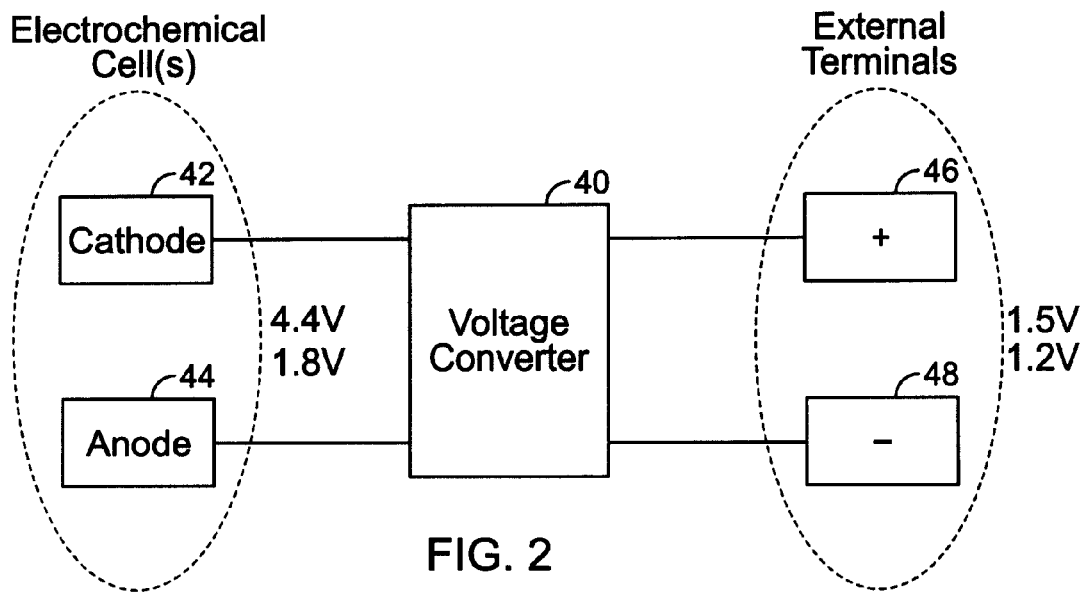
FIG. 2 is a block diagram of the internal configuration of the battery shown in FIGS. 1A-C.

Referring to FIG. 2, the battery 10 includes an internal cathode terminal 42 and an anode terminal 44 that are electrically coupled to the at least one electrochemical cell (e.g., the jelly roll 14.) The electrochemical interactions occurring within the jelly roll 14 result in an internal first voltage $V_i$, formed at the cathode 42 and anode 44 which is then provided to the voltage converter 40. The internal first voltage depends on the chemistry of the battery and can have a value in the range of 1.8-4.4V. The internal first voltage $V_i$, is provided to the integrated voltage converter module 40. As explained above in relation to FIG. 1A, the integrated voltage converter 40 is disposed inside the voltage converter housing 16 and is electrically connected to the electrochemical cell via the tabs 18 and 22 that are respectively coupled to the cathode 42 and anode 44. As will become apparent below, the voltage converter module 40 converts the internal voltage $V_i$ to an external second voltage level $V_e$ required to operate a battery-operable devices (e.g., flash lights, cell phones, cameras, etc.) In some embodiments, the external second voltage has a voltage level in the range of, for example, 1.2-1.5V. The DC-DC voltage converter module 40 may also be configured to increase the voltage level formed at the cathode 42 and anode 44.

In some embodiments, the converter 40 converts the DC internal voltage $V_i$ to an external voltage $V_e$ based, at least in part, on user specified input provided through a user interface disposed, for example, on the battery casing 12. Such a user interface may include, for example, switches, through which a user may indicate the desired voltage for the battery-operable device. In some embodiments, determination of the external voltage may be performed by identifying the desired external voltage using, for example, a voltage indication mechanism (e.g., an indication mechanism that uses an ID resistor) that provides data representative of the voltage needed to operate the battery-operable device. Other types of voltage indication mechanisms, including mechanisms based on Radio Frequency Identification (RFID) technology, may be employed.

The second external voltage $V_e$ is provided to external terminals 46 and 48 located, respectively, at the positive terminal cap 20 and negative terminal cap 24 shown in FIGS. 1A-C.

Figure 3:
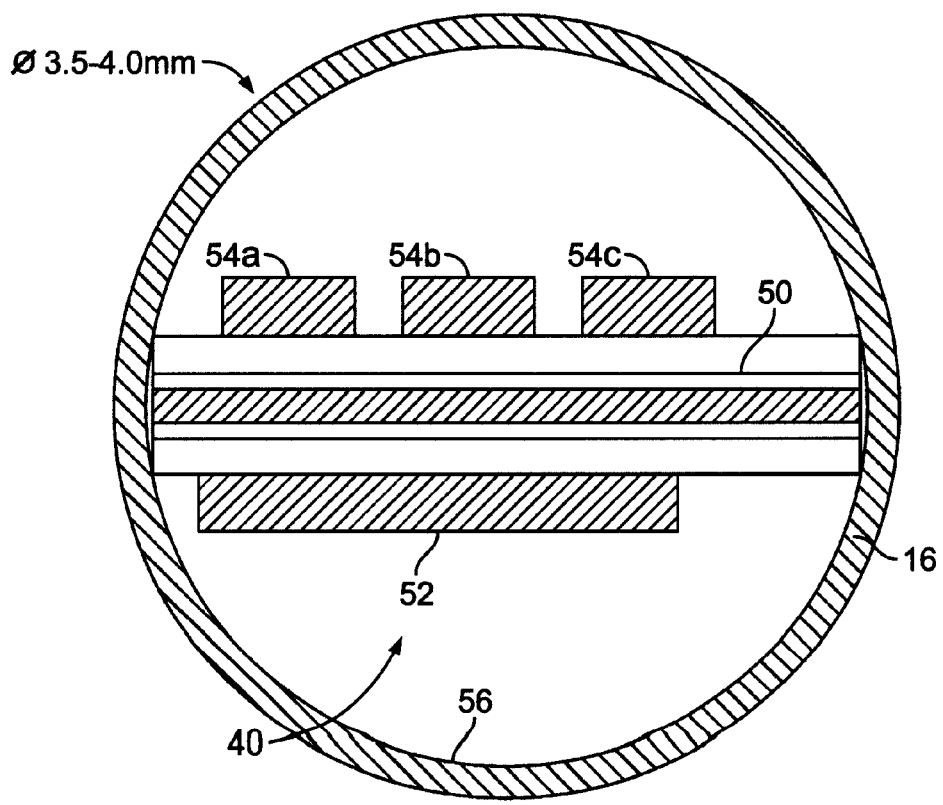
FIG. 3 is a cross-section view of an exemplary embodiment of the physical layout of the of the voltage converter of FIGS. 1 and 2.

FIG. 3 is a cross-sectional view of the converter housing 16 taken along the lines 3-3 shown in FIG. 1A. As shown, disposed inside the interior volume of the converter housing 16, as defined by inner walls 56 of the housing 16, is an exemplary embodiment of the voltage converter module 40. The converter housing 16 is hermetically sealed using potted epoxy and plastic seals, thus protecting the converter's circuitry from any outside materials (e.g., the electrochemical cells and or the electrolyte.)

As discussed, typically a jelly roll based cell is provided by winding the constituents of the jelly roll about a mandrel. As a result of this, an internal void, or bore, 15 (shown in FIGS. 1A-C) is provided within the jelly roll 14. In some embodiments, the internal bore 15 extends along the longitudinal axis of the jelly roll 14. The converter housing 16 that contains the electrical circuitry of the DC-DC converter 40 is placed in the bore, thus occupying at least a portion of the space of the bore. By placing the converter housing 16 into the bore 15, the converter housing 16 occupies space that would otherwise be not used in the battery. Since this space in not generally used, the addition of the DC-DC converter 40 provides the integrated arrangement without either increasing the size or changing the configuration of the battery housing or otherwise reducing the battery charge capacity. In contrast, if the DC-DC converter 40 was placed outside of space in the jelly roll, the jelly roll would need to be made smaller, thus reducing cell capacity, in order to maintain the same size and configuration of the battery. Moreover, current is drawn from the jelly roll via tabs 18 and 22 that couple the jelly roll to the converter housing 16 that contains the electrical circuitry of the DC-DC converter 40 (see FIGS. 1A-C).

The voltage converter module includes a dual layer printed circuit board (PCB) 50 that is populated with active and passive electronic components. The PCB 50 is fitted into the interior of the converter housing 16. As shown, the PCB 50 has a width that is substantially equal to the diameter of the hollow cylindrical converter housing 16 (e.g., 3.5-4.0 mm) such that in some embodiments the PCB board 50 is held in place by the tension forces exerted by the inner walls 56 of the converter housing 16. In some embodiments, an attachment mechanism may be used to secure the PCB board 50 onto the inner walls 56 of the converter housing 16.

Disposed on one surface of the PCB board 50 is the controller 52 of the DC-DC voltage converter module 40. The controller 52 is configured to control switching devices, such as transistors, to cause an external voltage/current having a level determined by, for example, the controller 52, to be applied at the external terminals 46 and 48 of the battery 10. In some embodiments, the controller 52 also includes the switching devices (shown, for example, in FIG. 5). As further shown in FIG. 3, disposed on the opposite side of the PCB board 50 are passive components 54a-c, such as resistors, inductors, and/or capacitors used in the implementation of the DC-DC voltage converter module 40.

In some embodiments, the DC-DC voltage converter 40 may be implemented with a switching buck DC-DC converter circuit configured to reduce (or step-down) the internal voltage at the cathode 42 and anode 44 to the desired voltage level at the external terminals 46 and 48 of the battery. A step up embodiment could be provided.

Figure 4:
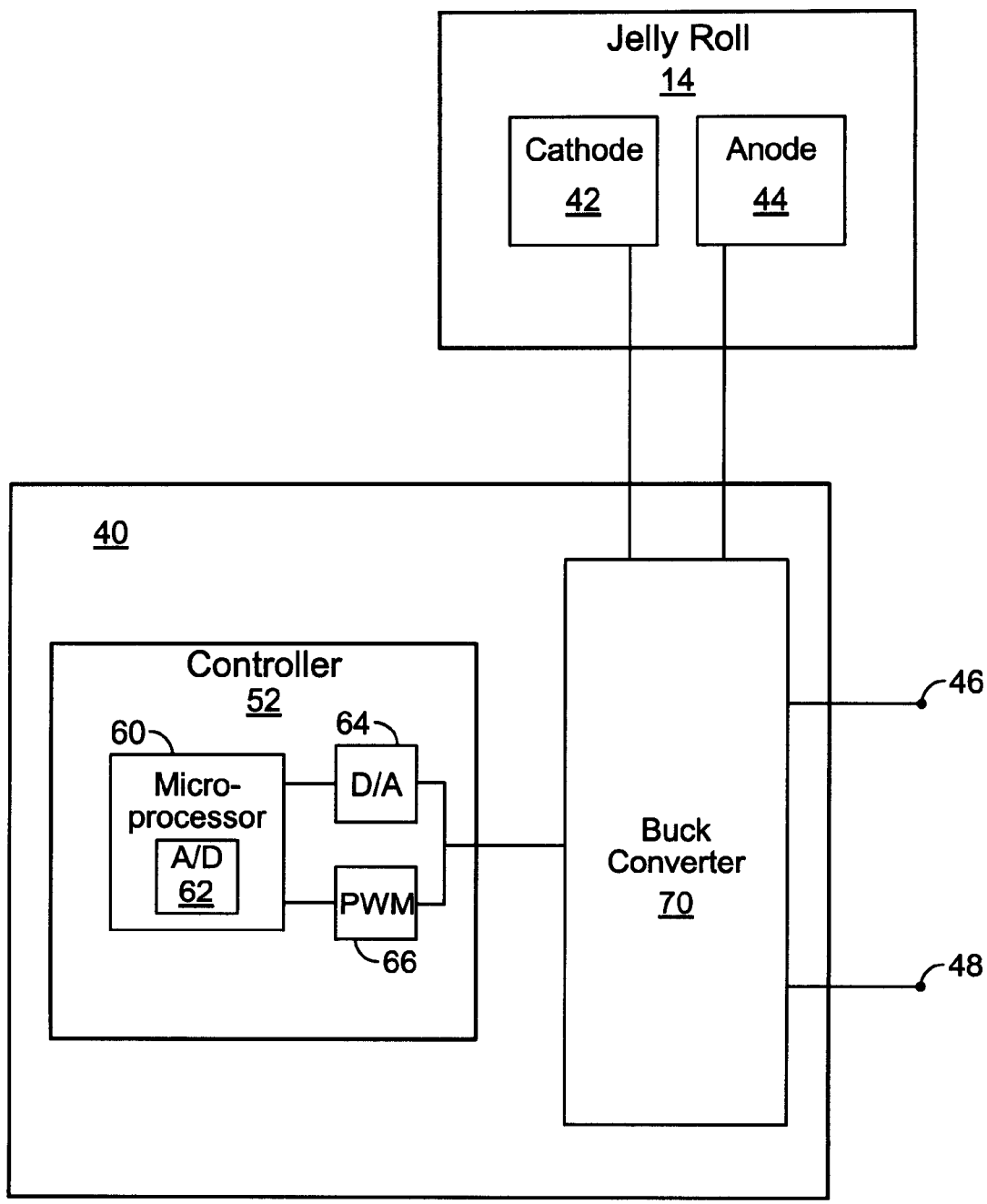
FIG. 4 is a block diagram of the voltage converter module of FIG. 3.

Referring to FIG. 4, the DC-DC voltage converter module 40 is shown. The DC-DC voltage converter module 40 includes the controller 52. The controller 52 includes the processor 60, which generates control signals to control operation of the buck converter 70. The processor 60 may be any type of computing and/or processing device. One example is a PIC18F1320 microcontroller from Microchip Technology Inc. The processor device 60 used in the implementation of the controller 52 includes volatile and/or non-volatile memory elements configured to store software containing computer instructions to enable general operations of the processor-based device, as well as implementation programs to perform voltage control operations to convert the internal voltage formed at the cathode and anode electrode of the battery 10 to a voltage level suitable for operating battery-operable devices. The processor device 60 includes an analog-to-digital (A/D) converter 62 with multiple analog and digital input and output lines. Incorporated to the processor 60, or electrically coupled to the processor 60, are a digital-to-analog (D/A) converter device 64 and/or a pulse-width modulator (PWM) 66 that receives digital signals generated by the processor device 60 and generates in response electrical signals that regulate the duty cycle of the switching circuitry, such as the buck converter 70 of the DC-Dc voltage converter module 40.

Figure 5:
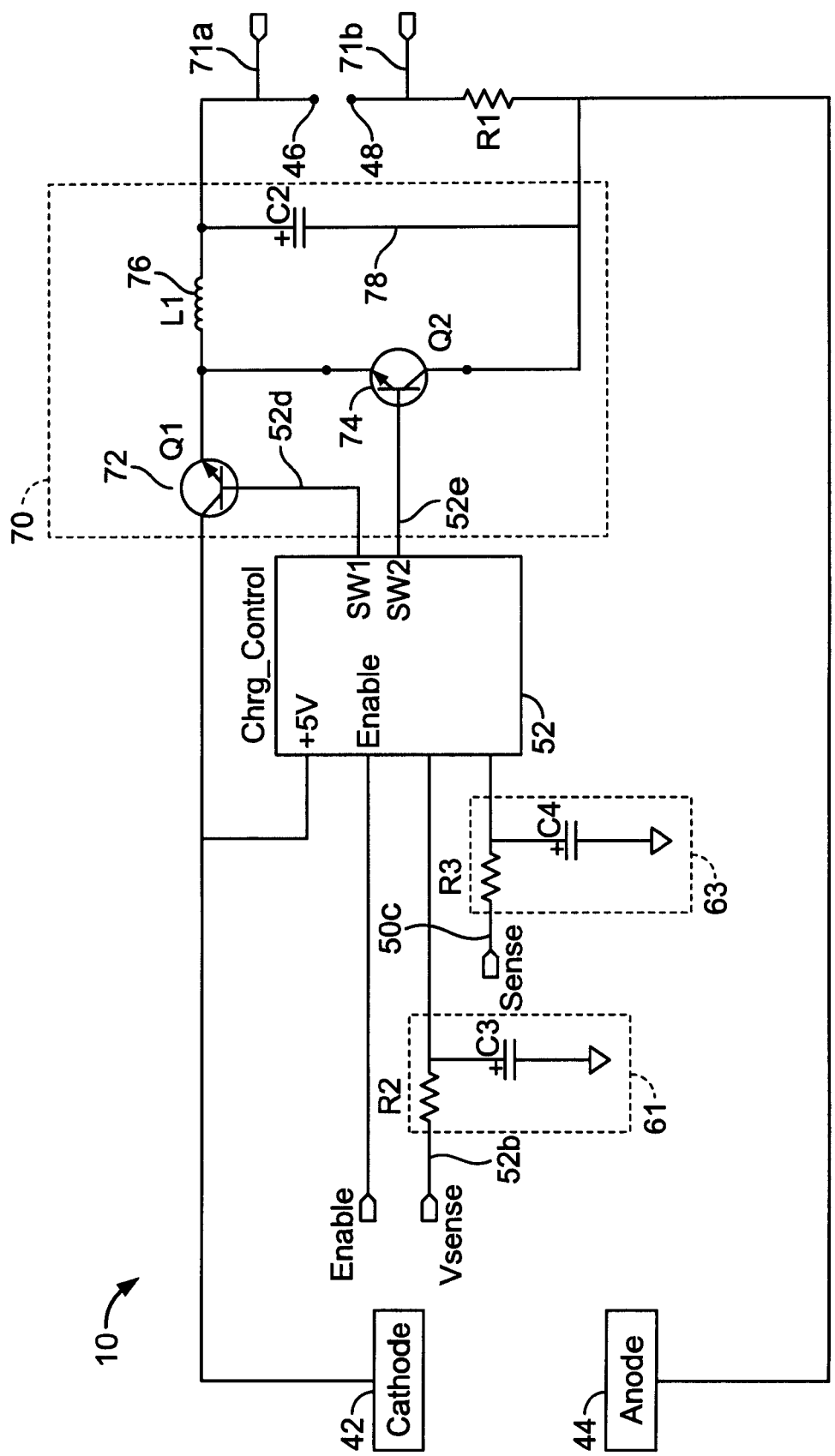
FIG. 5 is a circuit schematic of the voltage converter module of FIG. 4.

Referring now to FIG. 5, the buck converter 70 includes two, e.g., Bi-Polar Junction Transistors (BJT's) 72 and 74 and an inductor 76 that stores energy when the electrode of the battery 10 are in electrical communication with the buck converter 70, and which discharges that energy as current during periods that the battery's electrodes are electrically isolated from the buck converter 70. The buck converter 70 also includes a capacitor 78 that is also used as an energy storage element. The inductor 76 and the capacitor 78 also act as output filters to reduce the switching current and voltage ripples at the output of the buck converter 70.

The voltage level applied to the external terminals 46 and 48 is regulated by controlling the voltage level applied to the bases of the transistors 72 and 74. To cause power from the electrochemical cells to be applied to the external terminals 46 and 48, an actuating electric signal from a terminal 52d (SW1) of the controller 52 is applied to the base of the transistor 72, resulting in the flow of current from the electrodes 42 and 44 of the electrochemical cell(s) of the battery 10 to the transistor 72 and to the external terminals 46 and 48.

When the actuating signal applied to the base of the transistor 72 is removed, current flow from the electrochemical cells stops and the inductor 76 and/or the capacitor 78 supply current from the energy stored in them. During the off-period of the transistor 72, a second actuating signal is applied by the terminal 52e (SW2) of the controller 52 to the base of a transistor 74 to enable current flow (using the energy that was stored in the inductor 76 and/or the capacitor 78 during the on-period of the transistor 72) to the external terminals 46 and 48. In some embodiments, a rectifying diode is used in place of transistor 74.

The transistor's on-period, or duty cycle, is initially approximated as the period that would result in a voltage level substantially equal to the required external voltage level $V_e$. Such an approximation may be obtained by accessing a lookup table to relate the required external voltage $V_e$ of the battery 10 to the duty cycle that would result in the required external voltage level $V_e$.

The transistor's on-period, or duty cycle, is initially ramped up from 0% duty cycle, while the controller or feedback loop measures the output current and voltage. Once the required external voltage $V_e$ is reached, the feedback control loop manages the transistor duty cycle using a closed loop linear feedback scheme, e.g., using a proportional-integral-differential, or PID, mechanism.

Thus, the voltage/current provided by the electrochemical cells of the battery 10 during the on-period of the transistor 72, and the voltage/current resulting from the operation of the inductor 76 and/or the capacitor 78 during the off-periods of the transistor 72 should result in an effective voltage level substantially equal to the required external voltage level $V_e$.

In some embodiments, the controller 52 periodically receives (e.g., every 0.1 second) measurements of the voltage at the external terminals 46 and 48 measured, for example, by a voltage sensor 71a that communicates the measured values via a terminal 52b (marked VSENSE) of the controller 52. Based on this received measured voltage, the controller 52 adjusts the duty cycle to cause an adjustment to the external voltage $V_e$ at the external terminals so that that voltage converges to a value substantially equal to the required external voltage $V_e$. The buck converter 70 is thus configured to operate with an adjustable duty cycle that results in adjustable voltage level applied to the external terminals 46 and 48. Adjustment of the duty cycle may also be achieved using a current sensor 71b.

In addition to the voltage sensor and/or the current sensor, the charger 10 may include other sensors configured to measure other attributes of either the battery 10. For example, the battery 10 may include a temperature sensor (e.g., thermistor-based) to enable the controller 52 take remedial or preemptive actions in the event that the battery 10 is overheating.

The received measured signals are processed using analog logic processing elements (not shown) such as dedicated charge controller devices that may include, for example, threshold comparators, to determine the level of the voltage and current level measured by the voltage and/or current sensors. The DC-DC voltage converter module 40 may also include a signal conditioning blocks, such as filters 61 and 63, for performing signal filtering and processing on analog and/or digital input signals to prevent incorrect measurements (e.g., incorrect measurements of voltages, temperatures, etc.) that may be caused by extraneous factors such as circuit level noise.

The efficiency of the DC-DC buck converter depends, at least in part, upon selection of the step-down regulator IC and the external load. Generally, the efficiency of a battery (e.g., the percentage of input power ultimately delivered to the output of the power conversion circuit), such as the battery 10, is in the range of 85%-95%.

Figure 6:
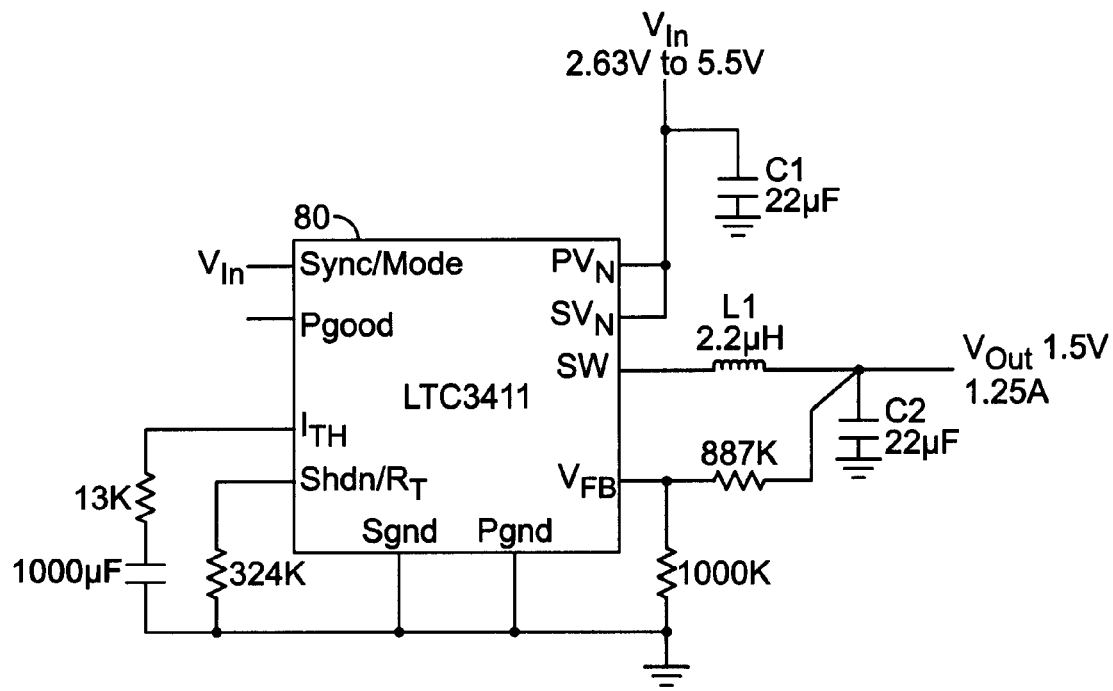
FIG. 6 is a circuit schematic of an exemplary embodiment of a voltage converter module implemented using an LTC3411 integrated circuit.

Referring to FIG. 6, in some embodiments, the DC-DC buck converter may be implemented using a high efficiency synchronous step-down regulator such as the LTC3411 converter 80 manufactured by Linear Technology Corp. The LTC3411 chip combines switching controller and the switching components (MOSFETs) in a single package. An advantage of the LTC3411 chip is that its relatively small size and efficient operation. Other types of buck converters, including other types of commercially available integrated circuits having similar functions may be used.

Figure 7:
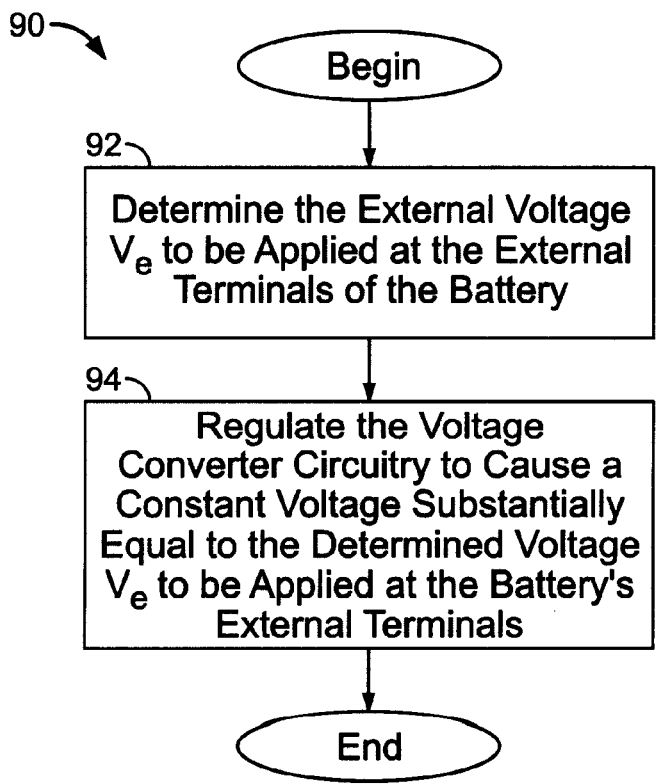
FIG. 7 is a flow diagram of an exemplary embodiment of a procedure to convert the internal voltage produced by the electrochemical cells of the battery of FIGS. 1A-C to an external voltage to be applied to a battery-operable device.

Referring now to FIG. 7, an exemplary procedure 90 to convert the internal voltage produced by the electrochemical cells of the battery 10 to an external voltage to be applied to a battery-operable device is shown. The voltage produced by the at least one electrochemical cells of the battery 10 is applied to the terminals of the converter 40 coupled to the cathode 42 and the anode 44. The power produced by the electrochemical cells is also used to power, and thus operate the converter 40. The voltage converter 40 determines 92 the external voltage $V_e$ that is to be applied to the external terminals 46 and 48 of the battery 10. In some embodiments, the external voltage is predetermined and the voltage converter 40 causes the internal voltage $V_i$ to be converted to the that predetermined value (e.g., a particular voltage level in the range of 1.2-1.5V). In some embodiments, external variable voltage levels may be generated by the converter 40. As explained herein, in such embodiments, the converter 40 may receive information regarding the desired external voltage from a user interface disposed on the battery case 12, or otherwise receive communicated information from a communication mechanism (e.g., a mechanism based on RFIF technology) and determine the voltage $V_e$ to be outputted based on the received information.

Having determined the external voltage that is to be applied to the external terminals 46 and 48 of the battery 10, the converter regulates 94 a DC-DC voltage converter circuitry, such as a buck converter, to cause a constant voltage substantially equal to the determined external voltage $V_e$ to be applied to the external terminals 46 and 48. As explained above, the determined external voltage level is used to generate a duty cycle signal applied to a switching device (e.g., the transistor 72) of the buck converter 70, to cause voltage substantially equal to the desired external voltage to be applied to the terminals 46 and 48. The combined current applied from the electrochemical cells during the switching devices' on-period, and the current discharged from energy storage elements of the buck converter 70 during the switching device's off-period, result in an effective voltage substantially equal to the required external voltage $V_e$.

As noted above, in some embodiments, the battery having an integrated voltage converter module is a rechargeable battery, e.g., a rechargeable battery that includes lithium-iron-phosphate electrochemical cells, and which is configured to be recharged to a charge level of, e.g., 80-90% capacity of the battery in less than fifteen (15) minutes. In some embodiments, the battery includes a cathode including $LiFePO_4$ as its active material, a carbon anode, a separator and an electrolyte. In such embodiments, the cathode may also include a binder. The thickness of the cathode will depend upon the cell design and required performance characteristics. The anode may be a carbon anode. The electrodes (cathode and anode) can be fabricated by providing a substrate and coating the substrate on both sides with the appropriate material, for example, carbon for the anode and a mixture of binder, conductive carbon and active material for the cathode. An exemplary embodiment of the a rechargeable battery based on lithium-iron-phosphate chemistry is described in the concurrently filed patent application entitled "Lithium Ion Secondary Batteries," the contents of which is hereby incorporated by reference in its entirety.

In some embodiments, the rechargeable battery 100 is a high energy density electrochemical system such as a Lithium-Ion battery having the working voltage span between 4.4V to 1.8.V with energy density above 300 Wh/L.

Figure 8A:
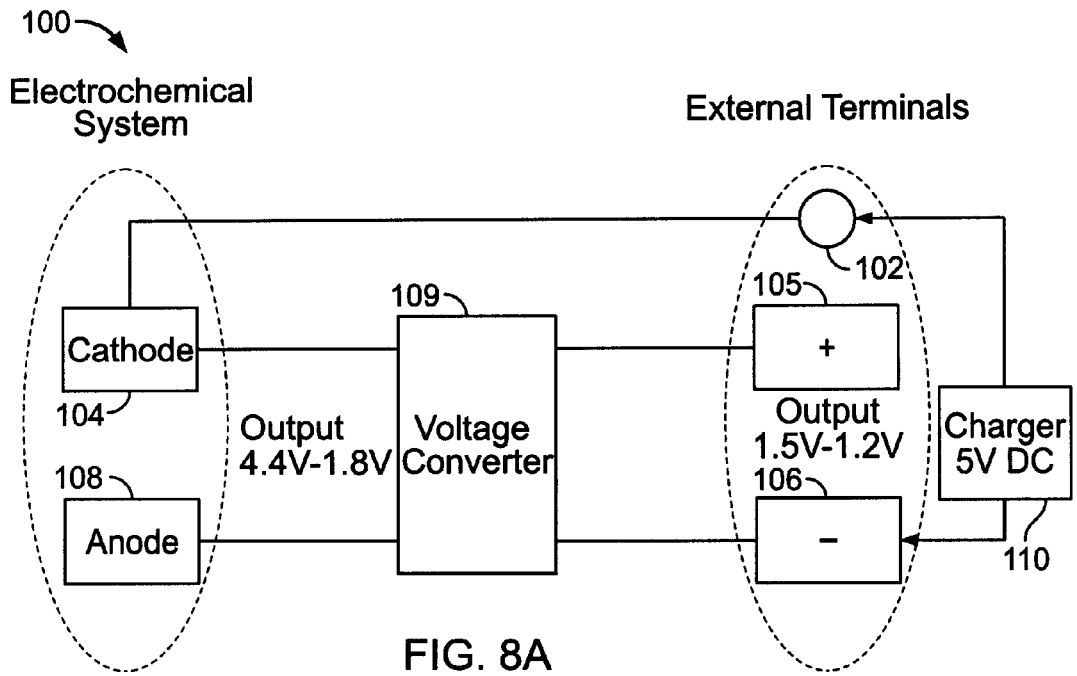
FIG. 8A is a block diagram of the internal configuration of an exemplary embodiment of a rechargeable battery with an integrated voltage converter.

Referring to FIG. 8A, an exemplary rechargeable battery 100 is shown connected to a charger 110. The battery 100 is similar in configuration to the battery 10 (FIGS. 1A-C and 2), but includes at least one additional external charging battery terminal 102 that is electrically coupled to the cathode 104, and which bypasses the integrated DC-DC voltage converter of the battery 100. The external battery terminal includes a contact surface (not shown) disposed on the exterior surface of the battery case (similar to the battery case 12 shown in FIG. 1A) of the rechargeable battery 100. When the battery 100 is received within a charging compartment (not shown) of the charger 110, one of the charger's terminals couples mechanically and electrically to the external charging battery terminal 102, whereas another of the charger's terminals mechanically and electrically couples to the external terminal 106 that is also used for connecting the battery to a battery-operable device. The anode 108 is connected to the voltage converter 109. When so connected, the charger 110, in operation, applies a charging current through the battery charging terminal 102 to replenish the charge level of the electrochemical cells of the battery 100. Exemplary embodiments of the charger 110, including embodiments configured to perform fast charge operations (e.g., cause the rechargeable battery to achieve a 90% charge capacity in less than 15 minutes) are described, for example, in the concurrently filed patent application entitled "Fast Battery Charger Device and Method," "Battery Charger with Mechanism to Automatically Load and Unload Batteries," "Portable Energy Storage and Charging Device," and "Lithium Iron Phosphate Ultra Fast Battery Charger," the contents of all of which are hereby incorporated by reference in their entireties.

Figure 8B:
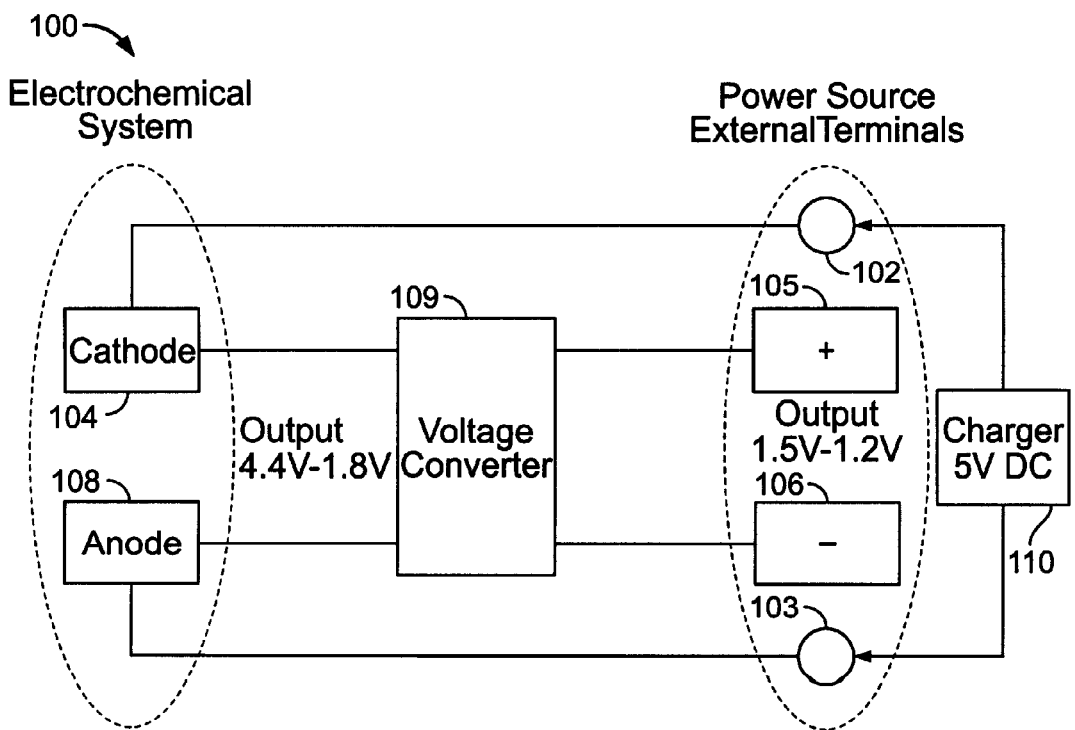
FIG. 8B is a block diagram of the internal configuration of another exemplary embodiment of a rechargeable battery with an integrated voltage converter.

Referring to FIG. 8B, in some embodiments, the rechargeable battery 100 includes a second charging terminal 103 that is directly electrically coupled to the anode 108. Thus, when the battery 100 is received within the charging compartment of, for example, the charger 110, the charger's terminals electrically and mechanically couple to the battery's charging terminals 102 and 103 and established a closed electrical path via the cathode 104 and the anode 108. The charging terminal 103 includes a contact surface (not shown) disposed on the exterior surface of the battery case, for example, near the negative cap (similar to the negative cap 24 shown in FIG. 1A.) Thus, in the embodiment of the rechargeable battery 100 shown in FIG. 8B, the rechargeable has dedicated charging terminals configured to receive and direct charging current applied by the charger 110 to the cathode and anode to replenish the charge in the jelly roll 14, and a separate dedicated set of external terminal 102 and 106 is used for applying the external voltage $V_e$.

Figure 11:
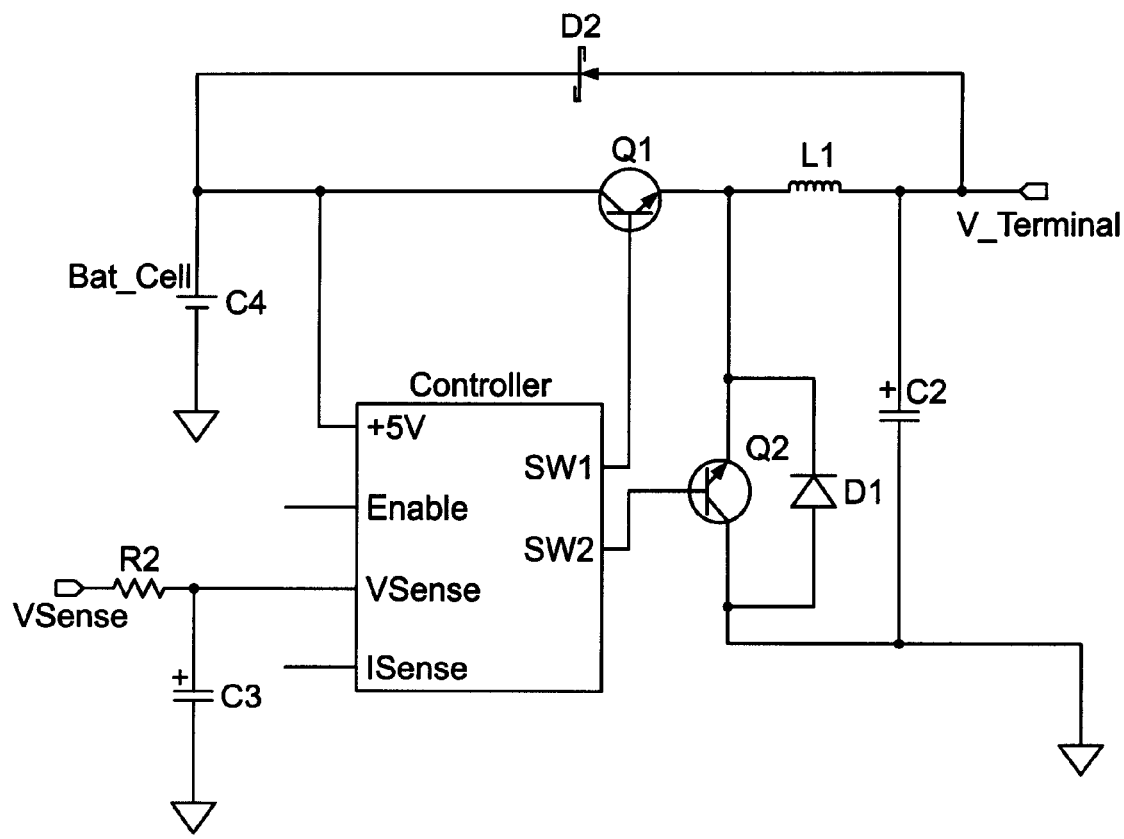
FIG. 11 is a circuit schematic of an exemplary embodiment of a bypass circuit.
Figure 12:
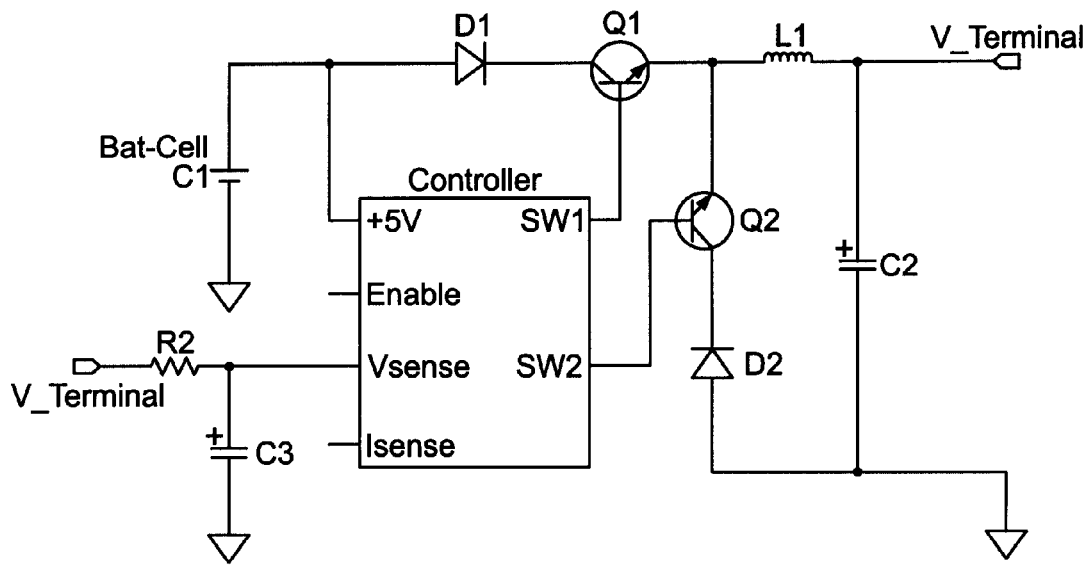
FIG. 12 is a circuit schematic of an exemplary embodiment of a bi-directional buck boost converter.
Figure 13:
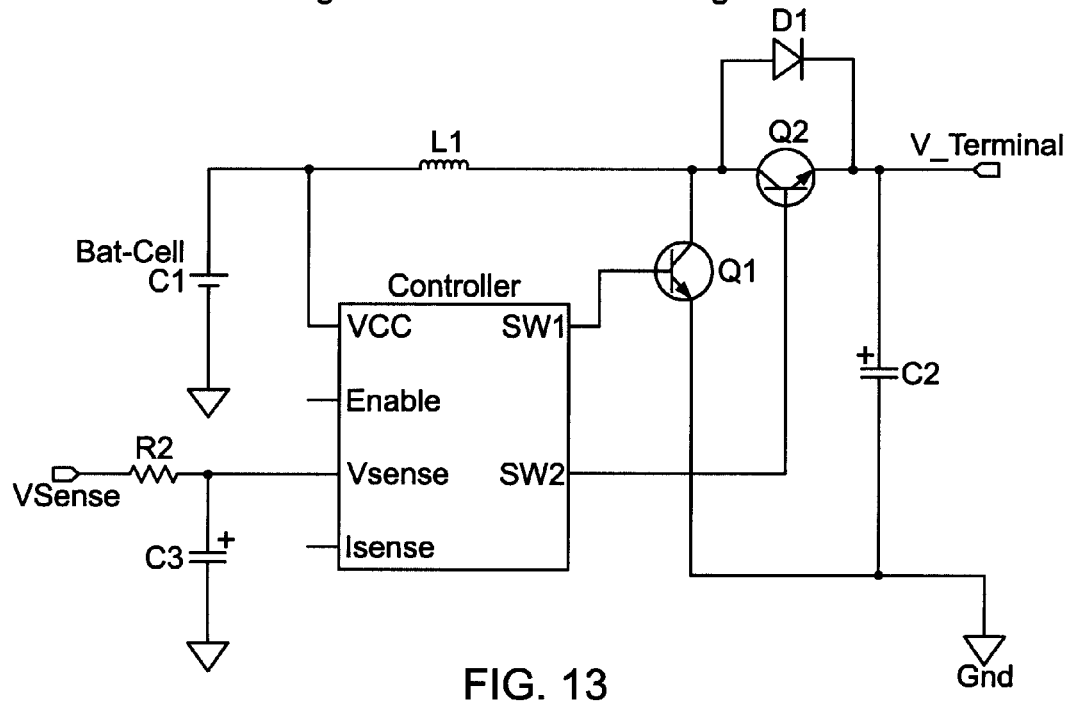
FIG. 13 is a circuit schematic of another exemplary embodiment of a boost converter.

In some embodiments, the separate set of dedicated terminals for applying charging current to recharge the electrochemical cells of the battery 100 is not used. In such embodiments, the charging current is applied to the battery's external terminals (i.e., the terminals, such as terminals 105 and 106 shown in FIGS. 8A and 8B, through which voltage produced by the battery and converted by the integrated voltage converter is applied to a battery-operable device.) Under these circumstances, the voltage converter may include a bypass circuit, e.g., diode D2, in FIG. 11, to direct the charging current received from the external terminals to the cathode and anode. In some embodiments, when using an internal boost converter, the external terminal voltage is higher than the internal cell (electrode pair) voltage. In this way power can flow both from the lower voltage electrode pair to the higher voltage terminal via the boost converter, but also in the opposite direction to allow charging of the cell from a higher voltage charging current source. In this mode the converter acts as a buck converter to reduce the charging voltage to the appropriate voltage for charging the lower voltage electrode pair. See FIGS. 12 and 13 showing electrical schematics for buck-boost converter embodiments.

Figure 9:
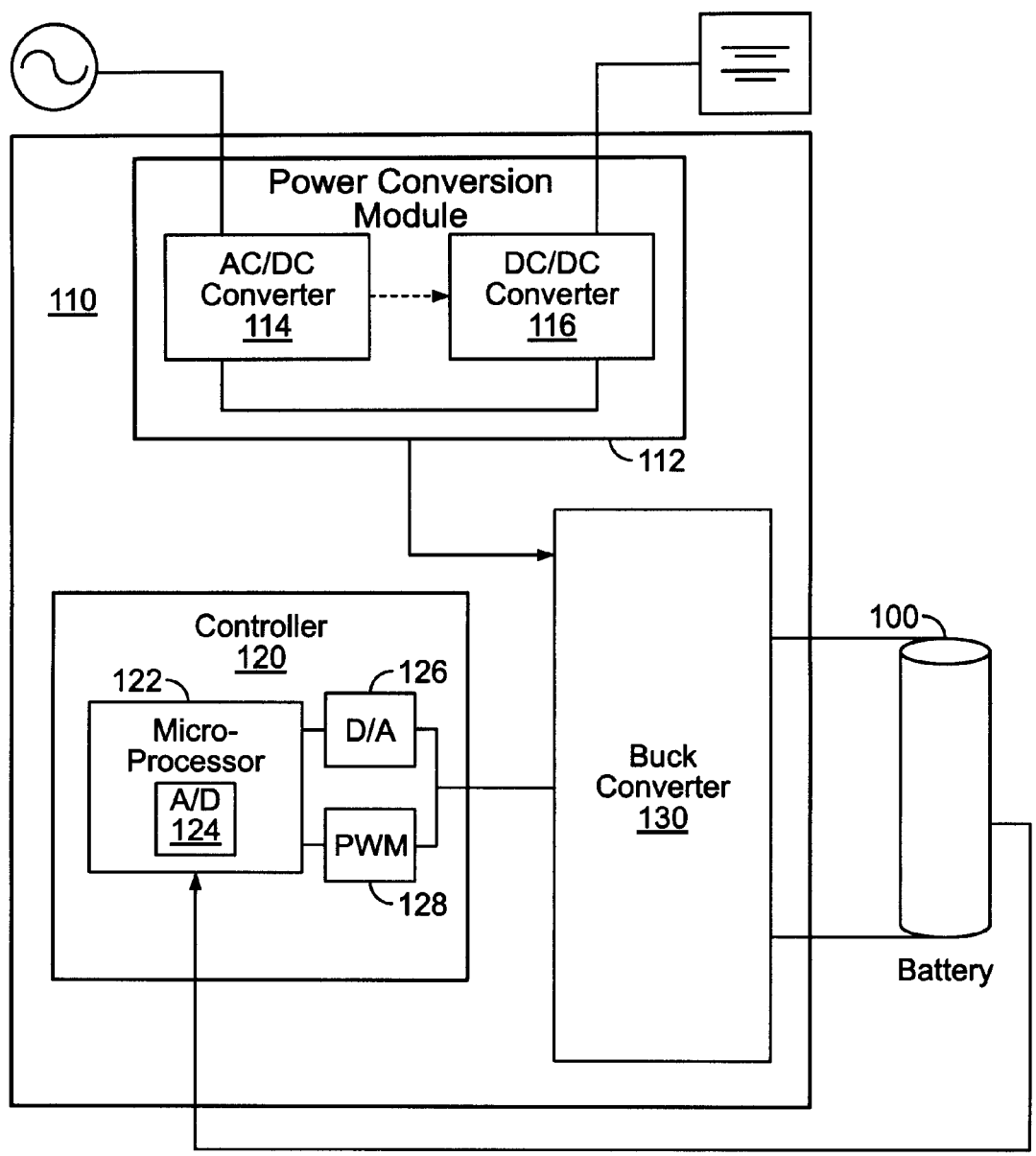
FIG. 9 is a block diagram of an exemplary embodiments of a charger device coupled to the rechargeable battery of FIG. 8A.

Referring to FIG. 9, the charger 110 is configured to apply a constant charging current to the battery upon commencement of the charging operation. During the period in which a constant current is delivered to the battery (i.e., the charger operating in constant current, or CC mode), the voltage of the rechargeable battery 100 increases. When the voltage of the battery 100 reaches a predetermined upper limit voltage of, for example, 3.8V (this upper limit voltage is sometimes referred to as the crossover voltage), the charger 110 is configured to maintain the battery's voltage at that upper limit voltage for the remainder of the charging period. During the period that a constant voltage substantially equal to the predetermined crossover value is applied to the battery 100, the charger 110 is said to be operating in constant voltage, or CV, mode.

The charger 110 is coupled to a power conversion module 112. In some embodiments, the power conversion module 112 is incorporated into the charger 110 and thus is disposed in the housing of the charger 110. The power conversion module 112 includes an AC-DC voltage converter module 114 that is electrically coupled to an AC power source, external to the charger, such as a source providing power at a rating of 85V-265V and 50 Hz-60 Hz, and converts the AC power to a low D.C. voltage (e.g., 5-24V), and, e.g., feeds this low D.C. voltage to, e.g., a DC-DC voltage converter module 116 to provide a level suitable for charging rechargeable batteries (e.g., DC voltages at levels of approximately between 3.7-4.2V for the rechargeable batteries having, for example, lithium-iron-phosphate electrochemical cell. Other types of cells may have different voltage levels, such as voltage levels in the range of 1.8-4.4V.)

The charger 110 further includes a controller 120 that is configured to determine the charging current to be applied to the rechargeable battery 100, apply to the battery 100 a current substantially equal to the determined charging current, and terminate the charging current after a specified or predetermined time period has elapsed, e.g., 5-15 minutes. The controller 120 may also be configured to terminate the charging operation once a predetermined battery voltage or charge level has been reached. In some embodiments, the controller 120 regulates a buck converter 130 to apply a constant 12 C charge rate (i.e., a charge rate of 1 C corresponds to the current that would be required to charge a battery in one hours, and thus 12 C is a charge rate that would to charge the particular battery in approximately 1/12 of an hour, i.e., five minutes.) Such a charge rate of 12 C is applied until a predetermined maximum charge voltage is reached, or a period of five (5) minutes has expired. Once the maximum charge voltage is reached, the controller 120 changes control modes and applies a constant voltage to the battery 100, until the predetermined charge time has expired, e.g., 5 minutes.

In some embodiments, determination of the charging current to be applied to the rechargeable battery 100 may be based, at least in part, on user specified input provided through a user interface disposed, for example, on the housing (not shown) of the charger 110. Such a user interface may include, for example, switches, buttons and/or knobs through which a user may indicate settings germane to the charging operation such as the capacity of the of battery that is to be recharged, the charging period, etc. To determine the specific charging current to use, a lookup table that indexes suitable charging currents corresponding to the user-specified settings/parameters is accessed.

In some embodiments, determination of the charging current may be perforated by identifying the capacity of the rechargeable battery 100 placed in the charging compartment of the charger 110 using, for example, an identification mechanism that provides data representative of the battery capacity and/or battery type. A detailed description of an exemplary charger device that includes an identification mechanism based on the use of an ID resistor having a resistance representative of the battery's capacity is provided in the concurrently filed patent application entitled "Ultra Fast Battery Charger with Battery Sensing", the content of which is hereby incorporated by reference in its entirety. In some embodiments, determination of the charging current may be performed by measuring at least one of the battery's electric characteristics indicative of the capacity and/or type of battery (e.g., the battery's DC charging resistance.) A detailed description of an exemplary charger device that adaptively determines the charging current based on measured characteristics of the battery is provided in the concurrently filed patent application entitled "Adaptive Charger Device and Method", the content of which is hereby incorporated by reference in its entirety.

The controller 120 includes a processor device 122 configured to control the charging operations performed on the battery 100. Like the processor device 60 of the converter 40, the processor device 122 may be any type of computing and/or processing device, such as a PIC18F1320 microcontroller from Microchip Technology Inc. The processor device 122 used in the implementation of the controller 120 includes volatile and/or non-volatile memory elements configured to store software containing computer instructions to enable general operations of the processor-based device, as well as implementation programs to perform charging operations on the battery 100 coupled to the charger 110, including such charging operations that result in the battery 100 achieving at least 90% charge capacity in less than fifteen (15) minutes. The processor device 122 includes an analog-to-digital (A/D) converter 124 with multiple analog and digital input and output lines. The controller 120 also includes a digital-to-analog (D/A) converter device 126, and/or a pulse-width modulator (PWM) 128 that receives digital signals generated by the processor device 122 and generates, in response, electrical signals that regulate the duty cycle of switching circuitry, such as the buck converter 130 of the charger 110.

The buck converter 130 is similarly to the buck converter 70 of the converter 40, and is configured to operate in a manner similar to the buck converter 70. Thus, the buck converter 130 includes switching devices, such as transistors (not shown), that are electrically actuated to enable current/voltage supplied by the power conversion module 112 to be applied to the battery 100 via, for example, the terminals 102 and 106. The buck converter 130 also includes energy storage elements (e.g., capacitor and/or an inductor) that store energy when current is delivered to the buck converter during the on-period of the converter's switching devices. When the switching devices cause current delivered from the power conversion module 112 to be cut-off from battery 100, the energy in the energy storage element(s) is discharged into the rechargeable battery 100. The current resulting from current applied during the switching devices' on-period and the current discharged from the energy storage element(s) during the switching devices' off-period is substantially equal to the required charging current that is to be applied to the rechargeable battery 100.

To regulate the current/voltage applied to the battery 100, the charger 110 also includes a feedback adjustment mechanism, implemented, for example, using the controller 120. The feedback adjustment mechanism is used to adjust the duty cycle for actuating the switching devices of the DC-DC voltage converter (e.g., the buck converter 130) so that the resulting current applied to the battery 100 will substantially equal the charging current determined by the controller 120. For example, in some embodiments, the controller 120 periodically receives (e.g., every 0.1 second) a measurement of the current flowing through the battery 100 as measured, for example, by a current sensor (not shown) that communicates the measured value to controller 120. Based on this received measured current, the controller 120 adjusts the duty cycle to cause an adjustment to the current flowing through the battery 100 so that that current converges to a value substantially equal to the charging current level.

The charger 110 may also include a voltage sensor (not shown), as well as other sensors configured to measure other attributes of either the rechargeable battery 100 and/or charger 110. For example, in embodiments in which thermal control of the charger 110 and/or the battery 100 is required (e.g., when the charging period to charge the battery 100 exceeds 15 minutes), the charger 110 may include temperature sensors (e.g., thermistors) coupled to the battery 110 and/or to a circuit board on which various modules of the charger 110 may be disposed.

Figure 10:
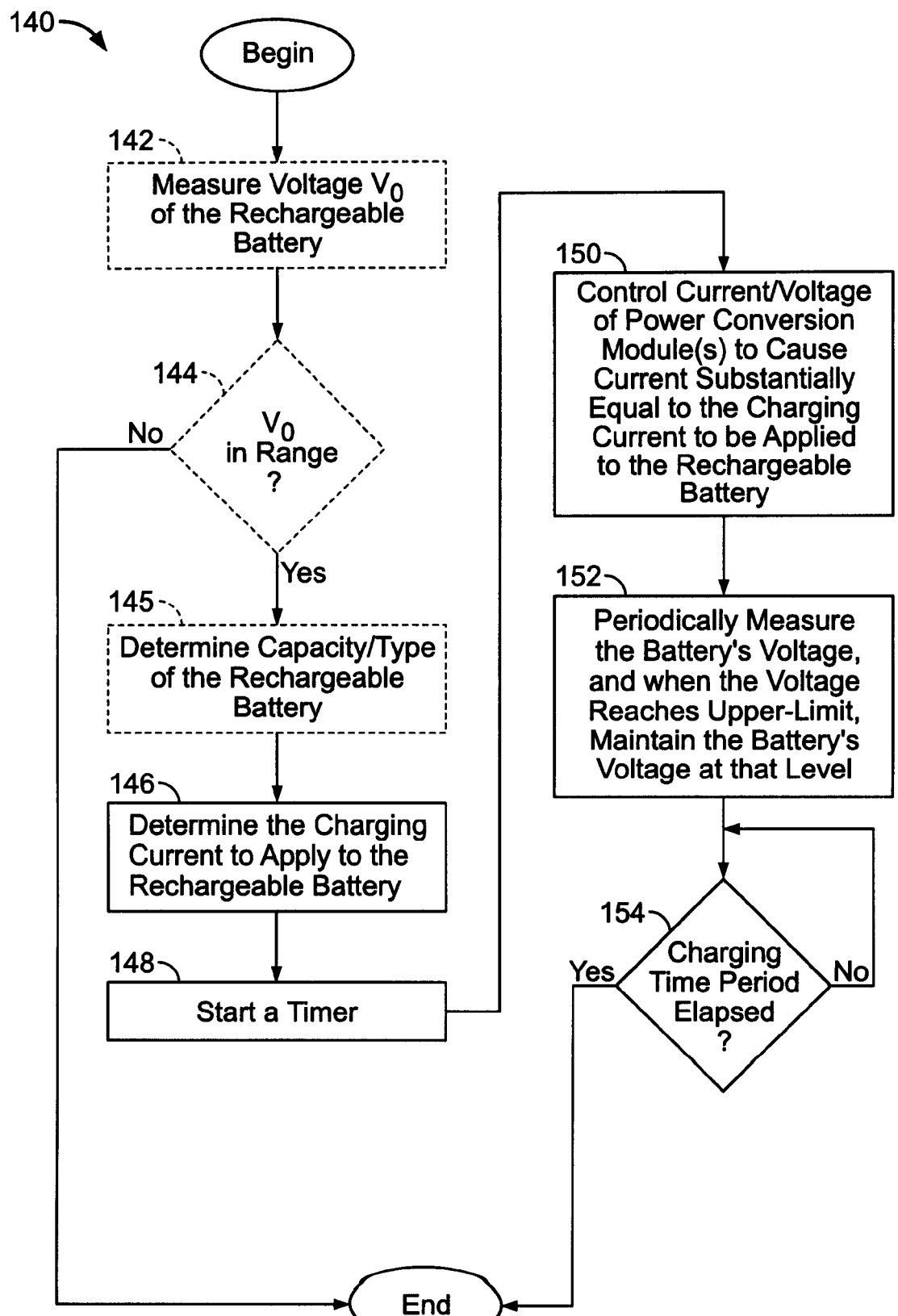
FIG. 10 is a flow diagram of an exemplary embodiment of a charging procedure to recharge the rechargeable battery of FIG. 8A.

Referring to FIG. 10, an exemplary charging procedure 140 to recharge the rechargeable battery 100 is shown. A battery is inserted into the charger and a user initiates the charging cycle by pressing a 'START' button disposed, for example, on the housing of the charger 110.

Prior to commencing the charging procedure, the charger 110 determines whether certain fault conditions exist. For example, the charger 110 measures 142 the voltage $V_0$ of the battery 100. The charger 110 determines 144 whether the measured voltages are within a predetermined range (e.g., between 2-3.8V.) In circumstances in which it is determined that the measured voltage, $V_0$ of the battery 100 is not within a predetermined acceptable range, thus rendering a charging operation under current conditions to be unsafe, the charger does not proceed with the charging operation, and the charging process may terminate. Under these circumstances, an indication of a problem may be provided to the user via a user interface on the housing of the charger 110.

The charger 110 determines 146 a charging current and/or a charging period to be used to charge the battery 100 based on information germane to the charging process, including the type of batteries, the charging period, the batteries' capacity, etc. For example, the charger 110 may be configured to determine a charging current to charge the battery 100 to at least a 90% charge capacity in less than 15 minutes.

The charger 110 may determine 145 the capacity and/or type of the battery 100 placed in the charging compartment of the charger 110. As explained herein, the information used to determine the charging current may be provided through a user interface disposed, for example, on the housing of the charger 110. Additionally and/or alternatively, information germane to the charging process may be provided through an identification mechanism through which the battery can communicate to the charger information representative of its characteristics (e.g., capacity, type), or by measuring electrical characteristics of the battery (e.g., the DC charging resistance), and determining, based on such measurements, the type and/or capacity of the battery 100. If the charger 110 is configured to receive a particular type of battery having a particular capacity, the charger 110 uses a predetermined charging current suitable for that particular battery and capacity. Determination of the charging current may be performed by accessing a lookup table that associates charging currents with different battery capacities, battery types, charging periods, etc.

Having determined the charging current to be applied to battery 100, a timer, configured to measure the pre-specified time period of the charging operation, is started 148. The timer may be, for example, a dedicated timer module of the processor 122, or it may be a register that is incremented at regular time intervals measured by an internal or external clock of the processor 122.

A current/voltage regulating circuit, such as, for example, the buck converter 130, is controlled 150 to cause a constant current substantially equal to the determined current to be applied to the rechargeable battery 100. As explained, the charging current determined is used to generate a duty cycle signal applied to a switching device (e.g., a transistor) of the buck converter 130, to cause current substantially equal to the charging current to be applied to the battery 100. During the off-time of a particular duty cycle, the power conversion modules 112 is cutoff from the battery 100, and the energy stored in the energy storage elements of the buck converter 130 (e.g., an inductor and/or a capacitor) is discharged to the batteries as current. The combined current applied from the power conversion module 112, and the current discharged from energy storage elements of the buck converter 130 result in an effective current substantially equal to the determined charging current.

In some embodiments, the charger 100 implements a CC/CV charging process. Thus, in such embodiments, the voltage at the terminals of the battery 100 is periodically measured 152 (e.g., every 0.1 seconds) to determine when the predetermined upper voltage limit (i.e., the crossover voltage) has been reached. When the voltage of the battery 100 has reached the predetermined upper voltage limit, the current/voltage regulating circuit is controlled to have a constant voltage level, substantially equal to the crossover voltage level, maintained at the terminals of the battery 100.

After a period of time substantially equal to the charging time period has elapsed, as determined 154, or after a certain charge or voltage level has been reached (as may be determined through periodical measurements of the battery 100) the charging current applied to the battery 100 is terminated.

EXAMPLES AND OTHER EMBODIMENTS

Many types of chemistries may be used with the embodiments described herein, including:

| Cathode | Anode |
| --- | --- |
| $LiMn_2O_4$ vs. | Li or C |
| $LiFePO_4$ vs. Li or C | Li or C |
| $MnFePO_4$ vs. Li or C | Li or C |
| $MnO_2$ vs. | Li |
| S vs. Li | Li |
| $Bi_2S_3$ vs. Li | Li |
| $Bi_2S_3$ vs. Li | Li |
| CuO vs. Li | Li |
| CFx vs. Li | Li |

The voltage converter can be tuned to operate at lower level in the range of 1.2-1.3V, thus providing even longer run time.

A number of embodiments of the invention have been described. Nevertheless, it will be understood that various modifications may be made without departing from the spirit and scope of the invention. For example, although the embodiments have been described as employing a down-converter to receive a first voltage from the battery and deliver a relatively lower, second voltage at the terminals of the battery, the converter can be configured as an up-converter that receives a first voltage from the buttery and delivers a relatively higher, second voltage at the terminals of the battery. Accordingly, other embodiments are within the scope of the following claims.

What is claimed is:
1. A battery comprising:
an electrochemical cell having an internal bore therethrough, the electrochemical cell including a jelly roll filled with an electrolyte solution, the jelly roll defining the internal bore passing through the electrochemical cell;

a voltage converter module electrically coupled to the electrochemical cell and disposed within a portion of the internal bore that extends through the electrochemical cell, the voltage converter configured to convert a first voltage produced by the electrochemical cell into a second, different voltage; and a case enclosing the electrochemical cell and voltage converter, the case supporting a set of external terminals disposed on the case to which the second voltage is provided.

2. The battery of claim 1 wherein the electrochemical cell is configured to be charged to a charge level of at least 90% capacity in fifteen minutes or less.

3. The battery of claim 1, wherein the electrochemical cell includes a lithium-iron-phosphate cell.

4. The battery of claim 1, further comprising:
a set of tabs coupled between the electrochemical cell and voltage converter module; and
a second set of tabs coupled between the voltage converter module and external terminals supported by the battery case.

5. The battery of claim 1 wherein the voltage converter module comprises:
an electronic switching device; and
a controller electrically coupled to the electronic switching device, the controller configured to control the electronic switching device.

6. The battery of claim 5 wherein the controller is configured to:
monitor a voltage level at the set of external terminals; and
cause the electronic switching device to be switched based on the monitored voltage level so that the voltage level at the external terminal is substantially equal to a predetermined voltage level.

7. A battery comprising:
at least one electrochemical cell configured to be charged to a charge level of at least 90% capacity in fifteen minutes or less the electrochemical cell including a jelly roll filled with an electrolyte solution, the jelly roll defining an internal bore passing through the electrochemical cell;
a voltage converter module disposed within a portion of the internal bore that extends through the electrochemical cell and electrically coupled to the at least one electrochemical cell and configured to convert a first voltage produced by the at least one electrochemical cell into a second, different voltage;
a battery case that houses the at least one electrochemical cell and the voltage converter; and
a set of external terminals disposed on the battery case to which the second voltage is provided.

8. The battery of claim 7 wherein the voltage converter module comprises:
an electronic switching device; and
a controller electrically coupled to the electronic switching device, the controller configured to control the electronic switching device.

9. The battery of claim 8 wherein the controller is configured to:
monitor a voltage level at the set of external terminals; and
cause the electronic switching device to be switched based on the monitored voltage level so that the voltage level at the external terminal is substantially equal to a predetermined voltage level.

10. The battery of claim 7 wherein the at least one electrochemical cell includes a Li-Ion cell.

11. The battery of claim 10 wherein the Li-Ion cell includes a lithium-iron-phosphate cell.

12. The battery of claim 7 wherein the first voltage produced by the at least one electrochemical cell is greater than 1.8V.

13. The battery of claim 7 further comprising:
at least one additional terminal configured to receive charging current to recharge the battery and direct the charging current to electrodes coupled to the at least one electrochemical cell.

14. A method comprising:
converting, by a voltage converter module disposed within a portion of an internal bore that extends through an electrochemical cell, the electrochemical cell including a jelly roll filled with an electrolyte solution, the jelly roll defining the internal bore passing through the electrochemical cell, a first voltage at electrodes coupled to the electrochemical cell to a second, different voltage, with the electrodes and the electrochemical cell disposed in a battery case, the at least one electrochemical cell configured to be charged to a charge level of at least 90% capacity in fifteen minutes or less; and
providing the second voltage at external terminals disposed on the battery case.

15. The method of claim 14 wherein converting the first voltage comprises:
controlling an electronic switching device.

16. The method of claim 15 wherein controlling the electronic switching device comprises:
monitoring a voltage level at the external terminals; and
causing the electronic switching device to be switched based on the monitored voltage level so that the voltage level at the external terminals is substantially equal to a predetermined voltage level.

17. The method of claim 16 wherein converting the first voltage at the electrodes of the at least one electrochemical cell comprises:
converting the first voltage at the electrodes of at least one lithium-iron-phosphate cell.

18. The method of claim 15, further comprising:
determining a current level to apply to the at least one electrochemical cell such that the at least one electrochemical cell achieves a charge level of at least 90% of the charge capacity of the at least one electrochemical cell in fifteen minutes or less; and
applying a charging current substantially equal to the determined current level to the at least one electrochemical cell.

19. The method of claim 18 wherein applying the charging current comprises:
applying the charging current to the set of external terminals.

20. The method of claim 19 wherein applying the charging current comprises:
applying the charging current to at least one additional charging terminal disposed on the battery case, the at least one additional charging terminal coupled to the electrodes coupled to the at least one electrochemical cell.

* * * * *